United States Patent
Bosch et al.

(10) Patent No.: US 11,863,588 B2
(45) Date of Patent: Jan. 2, 2024

(54) DYNAMICALLY TAILORED TRUST FOR SECURE APPLICATION-SERVICE NETWORKING IN AN ENTERPRISE

(71) Applicant: Cisco Technology, Inc., San Jose, CA (US)

(72) Inventors: Hendrikus G. P. Bosch, Aalsmeer (NL); Sape Jurriën Mullender, Amsterdam (NL); Jeffrey Michael Napper, Delft (NL); Alessandro Duminuco, Milan (IT); Shivani Raghav, Crissier (CH)

(73) Assignee: Cisco Technology, Inc., San Jose, CA (US)

(*) Notice: Subject to any disclaimer, the term of this patent is extended or adjusted under 35 U.S.C. 154(b) by 169 days.

(21) Appl. No.: 16/867,642

(22) Filed: May 6, 2020

(65) Prior Publication Data

US 2021/0044623 A1 Feb. 11, 2021

Related U.S. Application Data

(60) Provisional application No. 62/883,964, filed on Aug. 7, 2019.

(51) Int. Cl.
*H04L 9/00* (2022.01)
*H04L 9/40* (2022.01)
(Continued)

(52) U.S. Cl.
CPC .............. *H04L 63/20* (2013.01); *G06F 9/547* (2013.01); *G06F 21/575* (2013.01);
(Continued)

(58) Field of Classification Search
CPC ..... H04L 63/20; H04L 63/0272; G06F 9/547; G06F 21/575
(Continued)

(56) References Cited

U.S. PATENT DOCUMENTS 6,678,828 B1 * 1/2004 Pham .................. H04L 67/1097
726/4
7,275,102 B2 9/2007 Yeager et al.
(Continued)

FOREIGN PATENT DOCUMENTS

WO WO2016105936 A1 6/2016

OTHER PUBLICATIONS

The PCT Search Report and Written Opinion dated Oct. 26, 2020 for PCT application No. PCT/US20/43590, 11 pages.
(Continued)

*Primary Examiner* — Christopher J Brown
(74) *Attorney, Agent, or Firm* — Lee & Hayes, P.C.

(57) ABSTRACT

Dynamically tailored trust for secure application-server networking and advanced enterprise security is provided. A system can individually assess the security posture of each application connecting to the Internet from each client device in an enterprise. For each application, the system tailors a security mode of the Internet connection based on the security posture of the application. Assessment of the security posture of an application is a comprehensive inventory of the security of the application, the security of the device hosting the application, the rights and security of the user, security attributes of the intended service or website being accessed, the security of the communication channel, and so forth. A network-based controller communicates with an agent running within a secure boot mode of each client device to select a security mode for application-service connection, including lean-trust direct access to the Internet, secure VPN-like access, or no access to the Internet.

18 Claims, 7 Drawing Sheets

(51) Int. Cl.
*G06F 21/57* (2013.01)
*G06F 9/54* (2006.01)

(52) U.S. Cl.
CPC ...... *H04L 63/0272* (2013.01); *H04L 63/0853* (2013.01); *H04L 63/1425* (2013.01); *H04L 63/1433* (2013.01)

(58) Field of Classification Search
USPC .......................................................... 726/1
See application file for complete search history.

(56) References Cited

U.S. PATENT DOCUMENTS

| | | | |
|---|---|---|---|
| 8,302,196 | B2 | 10/2012 | Soderberg et al. |
| 9,077,746 | B2 | 7/2015 | Chandrashekhar et al. |
| 9,756,047 | B1 * | 9/2017 | Batchu ................ H04W 12/088 |
| 10,523,660 | B1 * | 12/2019 | Volkov ................ H04L 63/0838 |
| 10,812,521 | B1 * | 10/2020 | Sharifi Mehr ...... H04L 63/1433 |
| 2006/0075506 | A1 * | 4/2006 | Sanda ..................... H04L 63/20 340/568.1 |
| 2009/0307753 | A1 * | 12/2009 | Dupont ............... H04L 63/0272 726/3 |
| 2015/0180832 | A1 * | 6/2015 | Yuk ........................ H04L 63/20 726/15 |
| 2015/0188949 | A1 * | 7/2015 | Mahaffey ............ H04L 41/0894 726/1 |
| 2016/0259941 | A1 * | 9/2016 | Vasudevan ............ G06F 21/572 |
| 2019/0190928 | A1 | 6/2019 | Anderson et al. |
| 2019/0223021 | A1 * | 7/2019 | Raju ...................... H04L 63/10 |

OTHER PUBLICATIONS

CST, "Web Application Security Assessment Report", Acme Inc., V1.0, Nov. 27, 2012, pp. 1-33.

Microsoft IT Showcase, "Implementing a Zero Trust security model at Microsoft", Aug. 6, 2019, pp. 1-4.

The International Preliminary Report on Patentability for PCT Application No. PCT/US20/43590, dated Feb. 17, 2022.

* cited by examiner

DYNAMICALLY TAILORED TRUST FOR SECURE APPLICATION-SERVICE NETWORKING IN AN ENTERPRISE

PRIORITY CLAIM

This application claims the benefit of U.S. provisional patent application 62/883,964, filed Aug. 7, 2019, the disclosure of which is incorporated by reference herein in its entirety.

TECHNICAL FIELD

The present disclosure relates generally to security architecture for enterprise computing and network communications, and more specifically to dynamically tailored trust for each application-service networking connection in an enterprise to provide advanced security for the enterprise.

BACKGROUND

Conventional zero-trust networking (ZTN) assumes that a network between a host device executing an application (APP) and a service, such as a software-as-a-service (SaaS) destination on the Internet, cannot be trusted. By not trusting the network as the intervening medium between endpoints, and relying instead on perfect end-to-end security between application and service, conventional ZTN theory holds that the conventional applications and services are better off, and systems as a whole are more secure because the application endpoints and service endpoints are theoretically controllable and can be fortified within themselves for maximum security against an Internet that is assumed to be untrustworthy.

This conception of the Internet as untrustworthy, and of applications and services as capable of being self-sufficiently armored, has shifted enterprise networking to a stance of neglecting network-based security measures. The conventional ZTN theory holds that VPN clients, firewalls, intrusion detection and prevention, reverse proxies, and so forth can be discarded as somewhat unneeded.

But simply relying on the direct communication between application and service to be a comprehensive form of security is shortsighted. For example, applications have vulnerabilities, cookies can be abused, leakage of key material between applications is ongoing, services get hacked, and email phishing still happens. Worse yet, by simply concluding that no help is required from the network to combat nefarious uses of systems ignores the opportunity to use the networks as a valuable tool for better security. Enterprise networks are controllable and malleable, which can be a weakness in the hands of outside forces, but on the other hand, can be enlisted with the right tools as an additional and comprehensive "layer" of security in managing threats to the enterprise and its equipment.

DESCRIPTION OF EXAMPLE EMBODIMENTS

Overview

Figure 1:
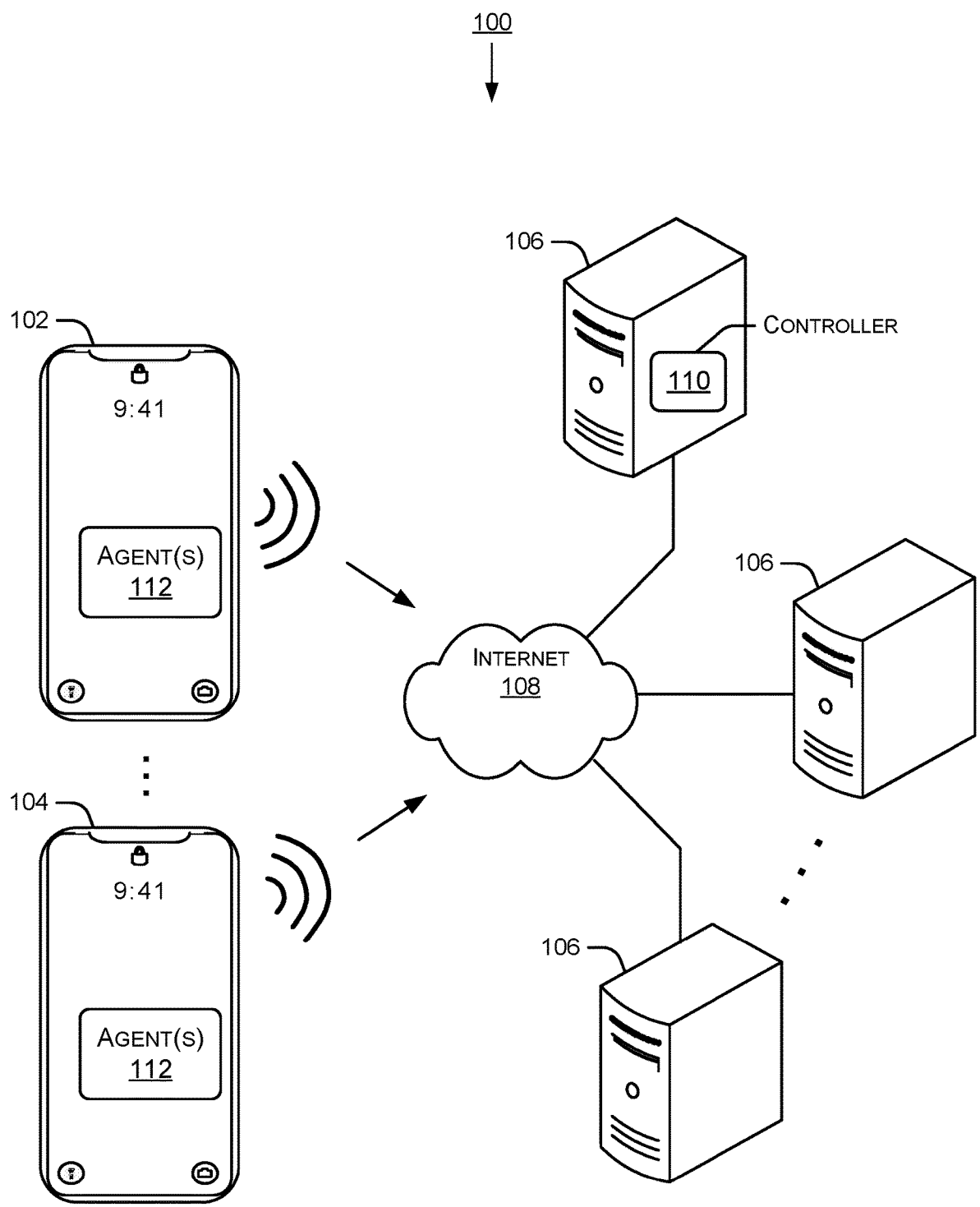
FIG. 1 is a diagram of an example system for providing dynamically tailored trust for secure application-service networking in an enterprise.

This disclosure describes techniques for dynamically tailoring trust of communication sessions between an application and a service via the Internet for secure networking in an enterprise. A method for performing the techniques described herein includes establishing communication between a client device and a network-based resource of an enterprise. Further, the method includes obtaining telemetry data associated with the client device from at least one of an agent running locally on the client device or the network-based resource of the enterprise, the telemetry data indicating a state/posture of a communication session between an application on the client device and an application service. The method further includes analyzing the telemetry data to determine a security posture of the communication session between the application and the application service. The method then determines an operation to perform with respect to the communication session based at least in part on the security posture. The method further includes performing the operation with respect to the communication session.

Example Embodiments

An example system for providing dynamically tailored trust for secure application-server networking and advanced enterprise security can individually assess the security posture of each application connecting to the Internet from a given computing device, such as a desktop computer, mobile device, or smartphone, within an enterprise. For each application on each device of the enterprise, the example system can individually tailor the security mode of an Internet connection for each individual application-server connection based on the current security posture of the application, including its security posture on a particular device used by a particular user.

Assessment of the security posture of an application on a given device within an enterprise in not limited to assessing the application itself, but is a comprehensive inventory of assessments with penetrating observation of an overall security context, including assessment of the security of the hosting device itself, the user's rights, clearances, history, and standing within the enterprise, attributes of the application such as its version, record of dataflows, connection history, the characteristics of the intended service or website to be accessed, attributes and security parameters of the communication channel, evidence of tampering/malware, and so forth.

In an implementation of the example system, a network-based controller of the enterprise communicates with instances of an agent or agents running within a secure boot mode on each client device of the enterprise. As used herein, "agent" means one or more agents on a device: an "agent" may be multiple agents. In cooperation with the network-based controller, the agent selects and enforces a security mode to be allowed for a given application connecting to a specific service via a specific network connection. In one embodiment, the available security modes for a single network connection between a given application and a given service are, depending on trust and security are: a "lean-trust network" (LTN) direct Internet access, a more secure overlay network with VPN-like access to the Internet when there are some security issues, or blocked access, with no Internet access, when there are obvious dangers or safety issues. These three security options for networking between application and service are examples. Depending on implementation, there can be more security mode choices available, and there can be different security mode schemes that apply more security modes than just the three described above.

The abovementioned lean-trust direct Internet access (LTN) is similar to unfettered direct Internet access that is often associated with zero trust networking (ZTN), except that the lean-trust model maintains ongoing risk and trust assessment of many different parameters and maintains control of the manner in which each service can be communicated with, being able to change the security mode of the network connection as warranted.

Conventional direct Internet access (DIA), with all stops removed, is not always appropriate for enterprise security, even if endpoint security is considered perfect. This is because reliable security depends on the trustworthiness of the client and server applications, but also depends on the environments in which they run, and there is no manner of achieving reliable security without also assessing at least the environment of each application, each device, each user, and each service to be connected with.

The example systems described herein adopt a working premise that the trustworthiness of applications and the environments in which they run are not static, but are subject to change and therefore should be monitored continuously if reliable enterprise security is desired. The example systems also adopt a working premise that not all breaches in security can be foreseen, so a vigilant observation of many metrics likely increases the security posture of an individual application making connection with a service via the Internet.

FIG. 1 shows a segment of an example system 100 of an enterprise, with client devices 102 & 104 in communication with servers 106 of the enterprise via the Internet 108. A network-based controller 110 of the enterprise communicates with instances of one or more agents 112 running within a secure boot mode on each client device 102 & 104 of the enterprise.

In an example implementation, the network-based controller 110 deploys information garnered by clients, network and services. The term "clients" means client devices 102 . . . 104 owned and/or operated by one or more persons working for the enterprise. The term "services" is used loosely to mean enterprise application services hosted inside or outside the enterprise, for example, on a public or private data center and/or cloud environments. The network, such as the Internet 108, includes routers, switches, access points, cellular networks, and links between these elements, and connects the client devices 102 & 104 to services. Applications are hosted on clients 102 & 104.

The network-based controller 110 can be an enterprise management application, and is hosted on one of the servers 106 of the enterprise or distributed on multiple servers 106, and may optionally include or be composed of scalable cloud-based services. In cooperation with the network-based controller 110, a given agent 112 or agents can assist in performing multiple assessments of the client device 102 that is hosting the one or more agents 112 and each application seeking to connect to a given service via the Internet. In an implementation, the main task of each agent 112 is to enforce the security decisions of the network-based controller 110 regarding the particular security mode to be allowed between an individual application on a client device 102 and an individual service being connected to via a network or via the Internet 108.

Agents 112 can be helper applications hosted on the client devices 102 & 104. As a traffic director and/or enforcer, for example, on the client device 102, each agent 112 enforces a security mode to be allowed for a given application-server connection commencing on the client device 102. The agent 112 enforces on the client device 102 an enterprise security decision received from the network-based controller 110 or negotiated cooperatively with the controller 110. As introduced above, the agent 112 in cooperation with the network-based controller 110 may enforce security modes such as lean-trust direct Internet access, secure VPN-like access to the Internet, or no access to the Internet, for example.

Each agent 112 can be built as hardware or installed as instructions for hardware on the client device 102, to operate within the protection of a secure boot mode or equivalent, on a given device 102. Secure boot mode defines an interface between an operating system of the client device 102 and the device's firmware and BIOS. Example secure boot modes are configured to resist attacks and infection from malware by detecting tampering, modification of boot loaders, tampering with key operating system files, and unauthorized option ROMs, by validating their digital signatures. An option ROM is firmware in BIOS shadowed into memory and executed to initialize the client device 102 and register the device 102 with the BIOS, acting like a driver to interface between BIOS services and the particular hardware of the client device 102. The example agent 112 is initialized in a secure boot mode so that detected problems or attempts to hijack or tamper with the agent 112 are blocked from running before they can attack or infect the agent 112. The agent 112 is coded with credentials to execute in secure boot mode, while modification of the code or the credentials, or removal of the credentials, results in a failed initiation of the agent 112 or rejection of the agent's startup. When the agent 112 has not initialized or the agent is not responding properly to the network-based controller 110, the client device 102 reverts to a maximum security mode as a default, either by onboard configuration or under instructions from the network-based controller 110.

The network-based controller 110 (or controllers) may have access to more resources than the resources on an individual client device 102, or the resources available locally to individual agents 112 on a device 102. In an implementation, the network-based controller 110 has a more global view of the enterprise than a given individual agent 112, since the network-based controller 110 is in contact with numerous instances of the agent 112 across the enterprise, and the agents 112 are not in direct contact with each other, except via the network-based controller 110. In another implementation, numerous instances of the agent 112 are in direct contact with each other and also in contact with the network-based controller 110, a configuration that can provide enhanced security in certain situations. In another scenario, an attack on the network-based controller 110 itself may be detected by one or more agents 112 on remote devices 102 & 104 resulting in each agent 112 acting in an orphan security mode, or resulting in multiple agents 112 applying a repair or reboot to the network-based controller 110, or otherwise notifying users in the enterprise that the network-based controller 110 has been compromised.

The network-based controller 110 is centrally hosted and more centrally accessible than the client devices 102 & 104 with respect to the enterprise and so has access to centralized resources, such as central databases 114. The central databases 114 keep more comprehensive records and histories, global specifications, policies, troubleshooting histories, malware identifications, real-time comparisons between remote agents 112, and greater overall knowledge than an individual agent 112 has immediate access to.

Because the network-based controller 110 has a global reach within the enterprise, when one instance of an application is observed to misbehave, the network-based controller 110 may direct distributed agents 112 to make assessment of other instances of the same application for the same misbehavior, even filtering further down to assess and control same versions or same releases of the application. The network-based controller 110 dynamically assesses enterprise endpoint security and makes deployment and connection decisions based on the assessment.

Figure 2:
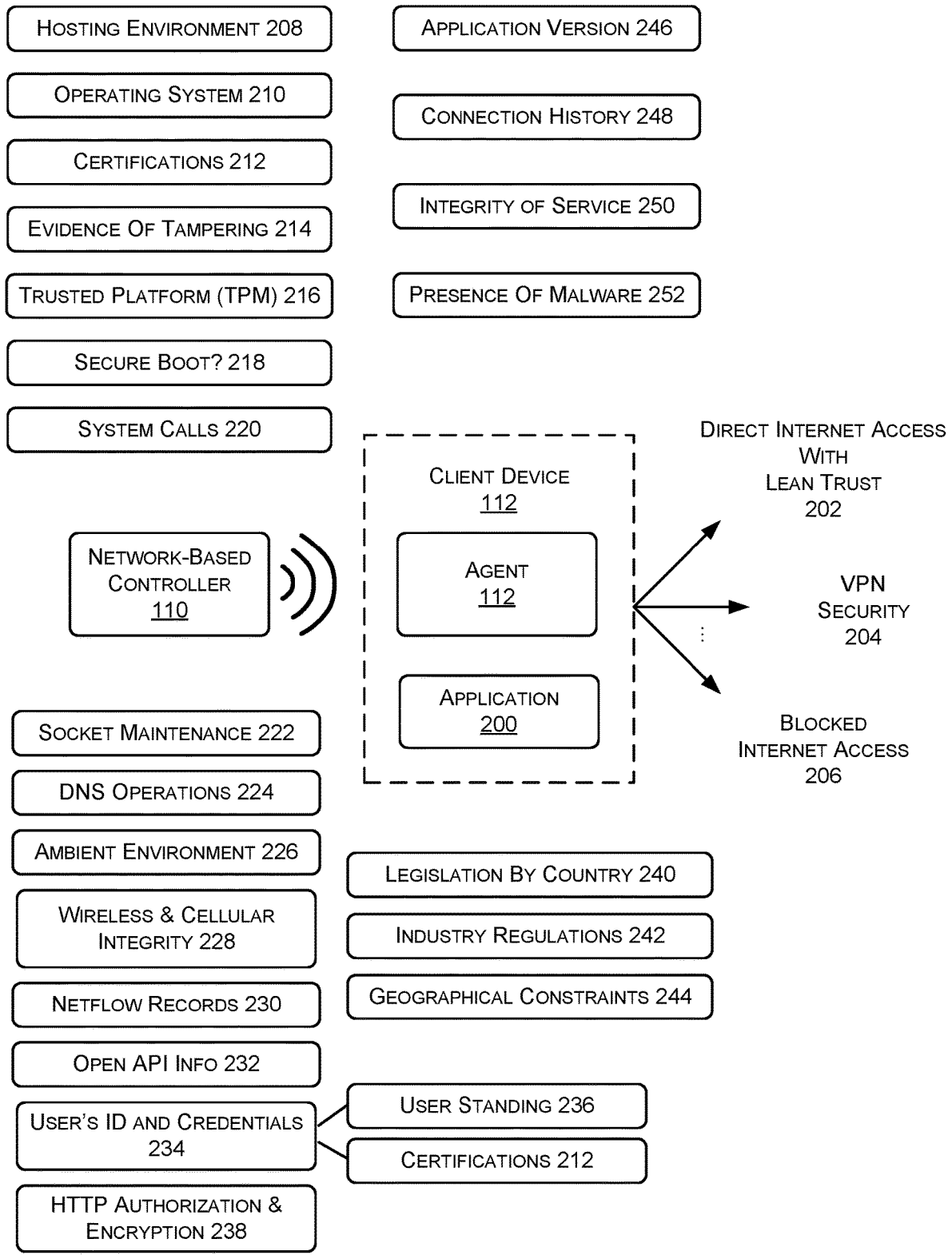
FIG. 2 is a diagram of example security assessments for establishing a security posture of an application for determining a security mode of a network connection to a service.

FIG. 2 shows an example relationship between the network-based controller 110 and an agent 112 on a client device 102 of the example system 100. The network-based controller 110 and the agent 112 of the example system 100 make assessments, represented in FIG. 2 by examples, to determine the security posture of an individual application 200 on an individual client device 102. The results of the numerous security assessments shown in FIG. 2, presented as examples, for determining the security posture is represented by a set of variables referred to herein as the "posture vector." Based on the assessed security posture of the application 200, the network-based controller 110 makes a decision using the posture vector that chooses a security mode for each individual application-service networking connection. One application-service pair might be allowed to run in a lean-trust direct-Internet access mode 202, while other application-service pairs may need to operate in a more secure mode using a VPN 204 and associated services, or other overlay network, for example. Yet a third application-service pair might be blocked entirely 206 from Internet access. It is worth noting that the same instance of the application 200 on the same client device 102 might be granted a security mode of direct Internet access (lean-trust) 202 with respect to a first service to be connected to, but might be more restricted 204 or blocked 206 with respect to a second service to be connected to. Thus, the same application 200 on the same device 102 can participate in different application-service pairs, for purposes of assessing the security posture of the application with respect to the two different application services.

The system 100 can apply different example techniques for identifying the vulnerability of a client application or service, and for providing tailored protection for the communication to be used by the application 200. The system 100 selectively enables or disables network-based security mechanisms to protect the users, client devices, and client application-service connections, even down to the granularity of protecting each network connection of each individual application 200 based on the vulnerability assessment of each user, client device 102, application 200, and service that the individual application 200 will use.

The example system 100 continuously assesses the security posture of the device 102 as part of the assessment of the security posture of a given communication session of a particular application 200, and establishes that the device 102 is operating in a secure-boot mode, and that the agent 112 is governable in this secure-boot mode. The enterprise securely manages one or more agents 112 on an employee's device 102, for example, in this implementation. The network-based controller 110 and the one or more agents 112 continuously gather information about the applications 200 and respective services used by the user, such as an employee, the application protocols used, and ongoing threats to these applications and services. In an implementation, the system 100 may also collect information from the given enterprise employee and can gather information about the employee's standing and certifications, and rights to services within the enterprise.

The agent 112 and network-controller 110 decide, on a communication-session by communication-session basis, by application 200 and service, device by device, and by particular employee standing, how to allow applications to connect to services: by direct Internet access 202 with lean trust, or by more secure traditionally secure network routing 204, for example. The security gradations for connecting to the Internet can include more options that just these two example choices. In an implementation, the client device 102 has the capability to fall back to traditional VPN-mode 204 as a default for all network connections in the case that the secure mode established by the secure boot sequence is broken.

The agent 112 on a given device 102 can detect and in some implementations manage multiple client states and their associated telemetry, including the hosting environment(s) 208 of the client device 102 (e.g., virtual machines), operating system release 210, certifications 212, evidence of tampering 214, availability of a Trusted Platform Module (TPM) 216, secure boot functions 218, authenticated application hosting 208, and the hosting of the agent 112 as introduced above, for example.

The agent 112 can monitor system-call trackers 220 to collect system calls information executed on the client 102, process operations, socket maintenance 222, and so forth. Domain Name System (DNS) information can also be monitored by the agent 112 through DNS proxies to capture a log of DNS operations 224 that applications make from the client device 102. The agent 112 can also monitor information related to hosted applications and information used to manage the secure installation of applications. Likewise, the agent 112 can gather security information related to the ambient environment 226 of a client device 102, including the SSID of wireless networks 228, for example, cellular network IDs, fingerprint and facial recognition information, and passcode settings.

In an implementation, client agents 112 are extended with telemetry obtained from network resources:

- DNS records 224 from enterprise-hosted DNS services
- Single Sign-On (SSO) records from SSO services
- NetFlow records 230 from routers carrying client traffic at an interface, which determine the source and destination of traffic, class of service, and causes of congestion (Cisco Systems, Inc., San Jose, CA)
- information learned from services through open APIs 232, about the services rendered
- employee (user) statuses 234 and standing 236 from HR-maintained identity providers
- information on the methods by which applications and services communicate can be gathered
- HTTP authentication and encryption methods 238 in use (none, TLS1.2, TLS1.3, or older standards)

use of earlier, and now defunct, authentication and encryption mechanisms that are no longer secure legislation 240, such as the European GDPR, which limits data storage and exchange, e.g., to within a country industry regulations 242 that are in place for the specific applications and services;

geographical constraints 244 that may be in place for the specific communication between applications and services.

Assessment of the application version 246, connection history 248, integrity of the service 250 to be connected to, and presence of malware 252 are captured and added to the telemetry data above. This information can be collected in a class of tools, such as Security Information and Event Management (SIEM) tools to allow aggregate data analysis.

The collection of information specific to a client, such as information collected from the client device 102, user, network communication, identity provisioning, and service operational states, is referred to herein as the "posture" of a session. The example system 100 uses this posture to assess and classify flows the client application 200 makes to a server, and uses this information to decide which protective measures are in order to make sure the given application 200 communicates securely to its service. The posture is represented by a set of variables we call the posture vector.

An unhealthy posture for a given application 200 may cause leakage of secret authentication information. So the posture vector is used to appropriate a course of action for a session. In extreme cases, an unhealthy posture may lead to a decision to not allow any communication with servers at all. In less dire situations, a communication flow may be forced through a VPN and more traditional security measures that can be applied to transport layer security (TLS) sessions connecting the application 200 to a service.

With a healthy posture, on the other hand, the application 200 opening a connection to a server can be identified, and the server can be interrogated to learn what operations were executed by the client 102.

When the application 200 (and its version) are known, and it is known to be an up-to-date version of the application 200 with no known security problems, and other conditions have been satisfied, for example, the posture vector indicates a "healthy session," then the application 200 can be allowed to communicate to its server of choice directly, using a secure and authenticated connection. But if not all security considerations and conditions have been satisfied, the posture vector indicates "health" problems and an appropriate tunnel may be created that provides additional protection by routing traffic through a trusted network overlay and, in some cases, communication can be denied altogether, for example, when the application 200 is not supposed to communicate with the service it selected.

To make such an assessment, a collaboration is necessary between, on one hand, the client 102 of set of client agents 112 that provide the basic information on posture, the application 200 and server selected, possibly stored in the SIEM tool for example, and, on the other hand, the network-based controller 110 that maintains a database 114 that can be consulted to decide what security measures are appropriate for the application-server connection about to be made. The decision from the network-based controller 110 can then be programmed into the client's network configuration to enforce the change of networking behavior. For this, the network-based controller 110 may need to contact the back-end service, (networking) agents 112 hosted on the client's device 102, and the accessible network that connects the two endpoints.

Thus, using the posture decision received, the example system 100 decides, on a session-by-session basis how a flow is to be routed and thus, how the application-service connection is treated. As an example:

Low posture sessions: deny access to the network;

Medium posture sessions: allow access to the network on a more secure network overlay, such as over a traditional VPN, possibly with a sequence of security services to control the session;

High posture sessions: allow direct Internet access for a session including enablement of lean-trust measures, or even zero-trust networking mode for some sessions.

The example system 100 allows the establishment and maintenance of a connection between a given application 200 and a service to be created according to the particular specification in the decision. The "low," "medium, or "high" settings are just examples, there can be more than three decision settings, for example, and an enterprise may classify sessions to be enabled in many other different ways. The values may be established by a chief security office of an enterprise, based on the actual values and ranges of entries in the posture vector introduced above and the mapping of these values and ranges onto the security needs of a specific enterprise.

The enforcement of the networking security decision reached by the network-based controller 110 is acted upon by the agent 112 that acts as gatekeeper for all networked communication on the specific client device 102. As a networking traffic gatekeeper, the agent 112 is programmed by the enterprise's network-based controller 110 for deciding how to treat traffic originating from various sources.

The security networking decisions, made by the network-based controller 110, are made using the posture vector information, including the standing of each application 200 in terms of security. The posture vector information is constantly updated, so in an implementation, the security decision cached by a client agent 112 expires in a reasonable amount of time. Alternatively, when the network-based controller 110 is in direct contact with the client-based agent 112, the controller 110 can dynamically enforce updates to the agent's behavior directly. For example, if the network-based controller 110 decides an application 200 on a client device 102 should be subject to the higher networking security of a VPN for a particular application-service connection, the network-based controller 110 can enforce that the agent 112 uses the VPN level of security on the client device 102 instead of the more lenient and less secure lean-trust direct Internet access security mode.

In an illustrative scenario, an application is discovered to misbehave. For example, an enterprise application 200 resolves and establishes a call to the dangerous website "malware.com." When this connection is discovered, the example system 100 can quarantine instances of that same application 200 immediately, on every client device 102 & 104 in the example system 100. Depending on the seriousness of the application's misbehavior, the application 200 may be allowed to run only over supervised connections, such as VPNs with firewalls and intrusion-detection in place, or the application 200 may not be allowed to run at all. Since every version of every application 200 has a unique ID or fingerprint, such measures can be applied to every version of an application 200 or to just one instance, or to a short list of versions. Thus, the example system 100 can enforce security operations on an individual application-service pair across numerous instances of application-device installations of the application across numerous client devices 102 & 104.

Figure 3:
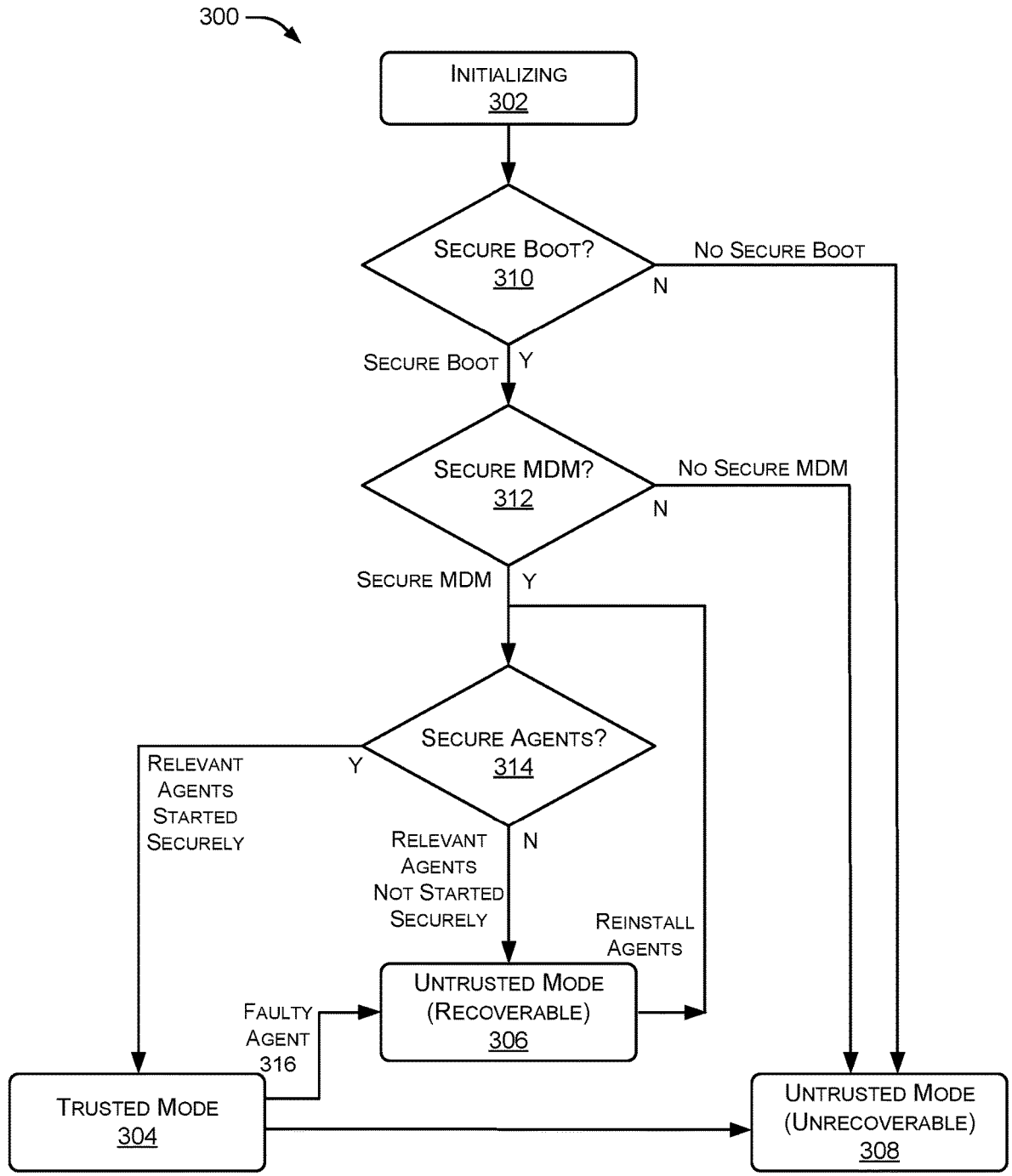
FIG. 3 is a block diagram of an example state machine for deciding trust modes of a client device.

FIG. 3 shows an example state machine 300 that shows example decision processes that can be executed within the example system 100 to select example security modes, such as an LTN-mode with direct Internet access and ongoing security assessments, a more restrictive VPN-mode with conventionally secure Internet access but less features than direct Internet access, or barred communication mode, in which Internet access between an application 200 and service is blocked. FIG. 3 also suggests how to realize these example security modes in subsequent state machines.

After initializing 302, the example state machine 300 decides if a client is operating in a trusted mode 304 or an untrusted mode 306 or 308. "Trusted" as used herein means a mode 304 in which the network-based controller 110 can trust client telemetry when determining how to route application traffic. In an untrusted mode 306 or 308, the network-based controller 110 is suspicious (less confident) about telemetry and client-based decisions, as when client traffic agents 112 may report faulty telemetry and/or the agent 112 may classify the traffic incorrectly, or not at all.

In the example state machine 300, the network-based controller 110 checks to see if relevant agents 112 are installed properly. There can be many different agents 112 operating on a client device 102, but not all agents are used to produce telemetry for the posture vector. Only when all relevant agents 112, as tabulated by the network-based controller 110, are properly installed and operating is the client device 102 a candidate for trusted operation in the view of the network-based controller 110.

In FIG. 3, after initializing, the example state machine 300 decides whether there was a secure boot 310. If the boot is not secure, the state machine decides on an unrecoverable untrusted mode 308 for network communication that remains untrusted 308 until the device 102 is rebooted. In the meantime, an application 200 on the device 102 may be allotted a security mode that blocks the Internet or uses a secured VPN network overlay for communications.

If the secured boot 310 was successful, the state machine 300 decides whether the Mobile Device Management (MDM) is secure 312. If the MDM 312 is not secure, the state machine 300 decides on the unrecoverable untrusted mode 308, which remains unrecoverable until the device 102 is rebooted.

If the MDM is secure 312, then the state machine 300 decides whether the relevant agents 112 on the device 102 are secure 314. If the relevant agents 112 are not secure, the state machine 300 decides on the recoverable untrusted mode 306, and proceeds to reinstall the agents 112, and then rechecks whether the agents are secure 314.

If the agents are determined to be secure 314, the state machine 300 decides on a trusted mode 304 in which the network-based controller 110 can decide to allow a direct Internet access mode for a given application 200 on the device 102.

In trusted mode 304, if a relevant agent 112 becomes faulty 316, the state machine 300 directs to a recoverable untrusted mode 306, in which one or more agents 112 may be reinstalled and reevaluated. If the trusted platform module (TPM) or the Mobile Device Management (MDM) become disabled in trusted mode 304, the state machine 300 directs to the unrecoverable untrusted mode 308 requiring a reboot of the device 102 to reset a possibility of entering the trusted mode 304.

In the trusted mode 304, the client device 102 is properly secured with a trusted platform module (TPM), the operating system boots securely 310, Mobile Device Management (MDM) is used to administer the client device 102, and the MDM 312 and other relevant agent(s) 112 are activated securely 314 as a side-effect of securely booting 310 the operating system. All these steps are necessary before the network-based controller 110 can trust the applications 200 and their agents 112 on the client device 102. If any of these steps are missing, the client device 102, the agents 112 it hosts and runs, and the data on which the agents 112 and operating system operate cannot necessarily be trusted, and the enterprise's network-based controller 110 treats the client device 102 accordingly. In an implementation, after the client device 102 enters trusted mode, the client device 102 is capable of communicating the trusted mode status to the network-based controller 110 in such a manner that the controller 110 can trust this communication. In other words, the secure operating system and the secure MDM on the client device 102 possess keys and certificates that can be used to prove to an outside entity, such as the network-based controller 110 that they are in control of the client device 102.

In this implementation, the example system 100 recognizes two untrusted states: the recoverable untrusted state 306 and the unrecoverable untrusted state 308. In the former recoverable state 306, when an agent 112 has not been installed properly, but the MDM agent is operating securely 312, simply installing or reinstalling the offending agent 112 may help recover from this untrusted state 306. Yet, if the system 100 is not, or cannot be securely booted 310 and/or MDM 312 is not properly installed or absent, the client 102 remains in the unrecoverable untrusted state 308. In the unrecoverable untrusted state 308, only a proper reinstall, enablement of TPM, and reboot can help to enter the trusted state 304.

In an implementation, the example system 100 can also recognize the case in which a trusted agent 112 misbehaves because of a faulty implementation, has "bugs," for example. This state transition is shown in the "faulty agents" step 316 in FIG. 3. The network-based controller 110 of the example system 100 can detect such misbehavior through a statistical audit process, for example. When misbehavior is detected, the agent version is marked as "faulty" 316 and the client 102 transitions to the recoverable untrusted state 306 until the bug is fixed and a new version of the agent 112 is released and installed. The above-introduced statistical audit process relies on other agents 112 to announce, periodically or on-demand, a list of active flows, allowing the network-based controller 110 to determine if the agent 112 is labeling and routing the flows as expected.

When a client 102 can be considered "trusted" 304, the network-based controller 110 can then decide, on an application-by-application basis, how it allows that application 200 to access the network.

Figure 4:
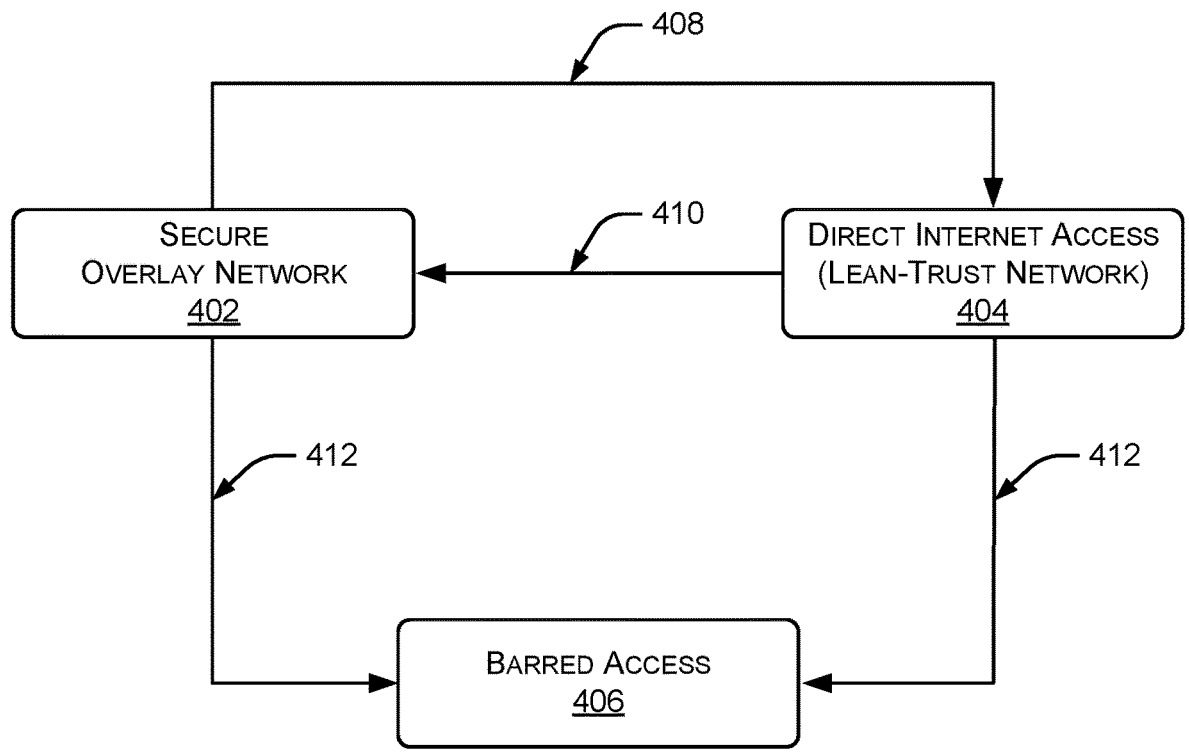
FIG. 4 is a diagram of example security modes of an application-server network connection, and transitions between the security modes.

FIG. 4 shows three example security modes 402 & 404 & 406 and their interrelation, as decided by the network-based controller 110 on an application-by-application basis when the client device 102 is operating in a trusted mode 304, as in FIG. 3. The three example security modes in FIG. 4 are introduced above in various examples, but are described below in greater detail with respect to FIG. 4:

Overlay networking mode 402—the client traffic agent 112 is instructed to tunnel all flows for the specific application 200 across an overlay network 402, and connects to this overlay network 402 by way of an attachment circuit, for example an IPsec/DTLS/TLS tunnel. The client traffic agent 112 identifies by way of header information, for example IP/MPLS formatting, or by the attachment circuit itself, the name of the application 200 and thus selects a specific overlay network 402. An overlay network 402 may or may not support (cloud-based) in-line security services, such as Secure Internet Gateway [SIG], zScaler, or traditional FW/IDS/IPS functions. Traditionally, such overlay networks 402 are called Virtual Private Networks (VPNs). This mode 402 is meant for applications 200, services, and enterprise employees or other users that may have some known security issues and the conversations between the application 200 and service need to be scrubbed of issues, quarantined, or logged. This mode 402 is also used for selective statistical analysis of flows.

Lean-trust network (LTN) mode 404—LTN networking mode 404 may provide Direct Internet Access (DIA) with ongoing safety assessments. In this mode 404, the network-based security controller 110 programs instructions into the client traffic agent 112 to allow the application 200 to bypass the more secure overlay network 402 and connect to the service directly. This mode 404 is specifically meant for those applications 200 and services in which there are no known issues with the applications 200 and services, and there is little risk of misuse; and the enterprise employee is in good standing. This LTN Direct Internet Access (DIA) mode 404 can provide guaranteed bandwidth, synchronous upload and download speeds, better throughput, a service level agreement, and better guaranteed response time, for example.

Barred mode 406—In this networking mode 406, the network-based controller 110 deems communication between the application 200 and the service to be not appropriate at all, and instructs the client traffic agent 112 on the particular device 102 to block all communication between that particular application 200 and service. This is a case where there are serious application 200 or service vulnerabilities. Other applications 200 on the same client device 102 may be allowed to use the LTN Direct Internet Access mode 404 above, or the overlay network (VPN) mode 402 above.

The three security modes 402 & 404 & 406 above are examples, other security modes and other schemes for partitioning a different number of security modes with a greater number or lesser number of security modes than the three modes above can be used.

To move between the various mode states as shown in FIG. 4, the example system 100 may implement the following steps:

Overlay mode to LTN mode transition 408—Reports of healthy application-service metrics and interactions, and other posture vector parameters the suggest little caution is needed, no known issues with the enterprise employee, and cleared statistical analysis may result in this transition 408 from a restrictive or more careful security mode 402 for the network connection of an individual application, to a network connection with more direct access 404, that is more lenient, and based on fewer or no detected safety or security issues.

LTN mode to Overlay mode transition 410—Reports of unhealthy application-service metrics and interactions, or other posture vector parameters that suggest caution, issues with the enterprise employee, and results of statistical analysis, for example, may result in this transition 410 from a less restrictive or less careful security mode 404 for the network connection of an individual application 200, to a network connection with more security 402 and with more stringent assessments, that is less lenient than LTN mode 404, based on some detected safety or security issues.

Overlay/LTN mode to barred mode transition 412—Reports of unhealthy application-service metrics and interactions or other negative posture vector issues may result in this transition 412 to blocked Internet 406 or barred network access. Enterprise employee issues are better captured in the overlay network mode 402, since the barred mode 406 allows no communication for the particular application 200 to its target service.

A statistical analysis state can enable the enterprise to sample specific "at random" sessions between applications 200 and services to assess if there are security considerations that need to be considered.

Figure 5:
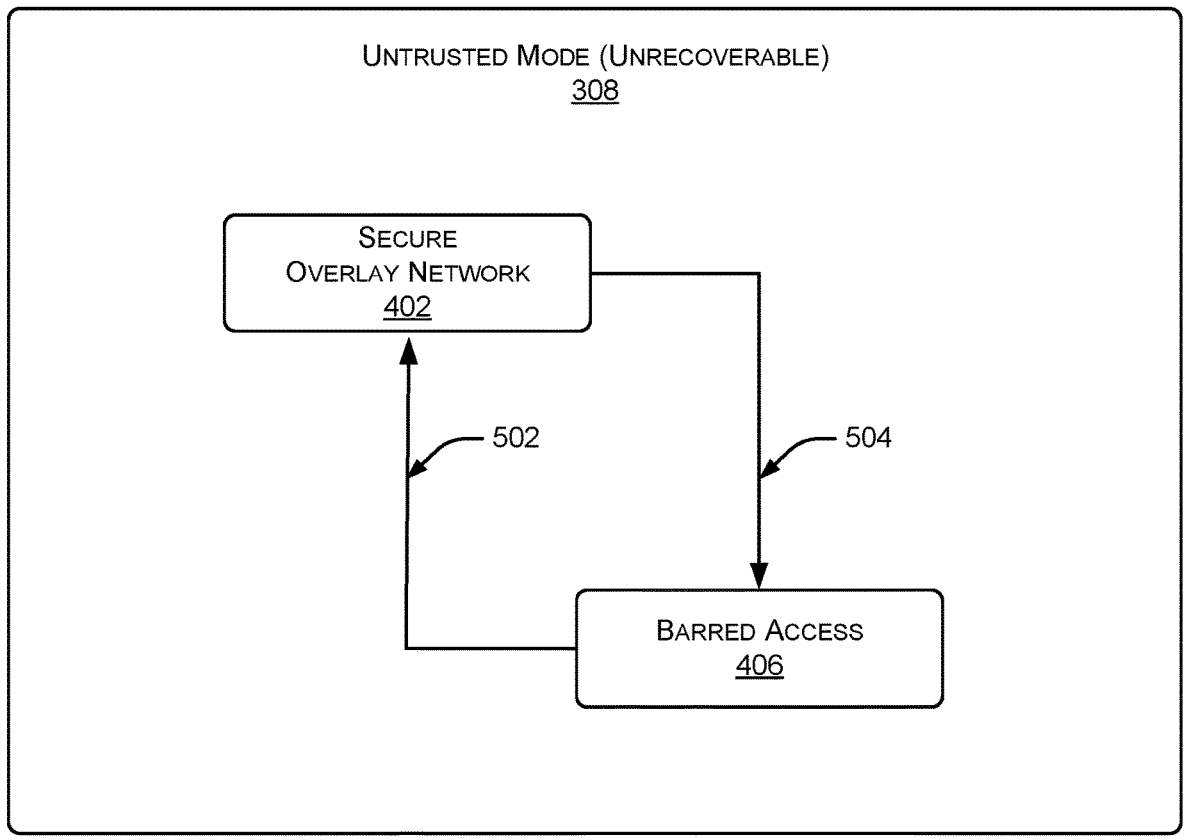
FIG. 5 is a diagram of traffic handling in an unrecoverable untrusted security mode of an application-service network connection.

FIG. 5 shows two states that can govern the unrecoverable untrusted mode 308 (FIG. 3) of a client 102. In this case, client agents 112 and specifically a client traffic agent 112 are not necessarily trusted to act on behalf of the network-based security controller 110. Application traffic 502 that must be sent across the overlay network 402 (e.g., VPN) can optionally pass traffic through zero inline services, one inline service, or multiple inline services to scrub, quarantine, or simply log the traffic. For the application traffic 504 that must be barred 406, the overlay network 402 can be instructed to simply discard all traffic for that application-service connection, possibly by using an SD-Access type of access control list.

What remains in the unrecoverable untrusted mode 308 is the case in which the client traffic agent 112 is simply ignoring instructions from the network-based security controller 110 and uses LTN direct Internet access 404 mode to communicate with the service despite the network controller 110 instructing the agent 112 not to do this. The traffic barring mechanisms may use, for example, a network posture tech-fund and may instruct the SSO to avoid handing out cookies for HTTP sessions between such applications 200 and services. For example, aspects of a Software-Defined Perimeter (SDP) may be used (Cisco System, Inc., San Jose, CA).

In summary, the example system 100 assesses by way of a security posture vector, whether and how enterprise employees can use direct Internet access 404 to communicate between an individual application 200 of a device 102 (mobile device for example) and (cloud) services in a lean-trust networking (LTN) mode 404, or if traditional enterprise networking 402 with higher security, such as a VPN, must be used for such a communication between an individual application 200 and a service. The client traffic agent 112, hosted as part of a secure boot infrastructure 310 of a (mobile) device 102, enforces the routing decision on a per application-service pair basis regarding how traffic is to be routed across a network. The client agent 112 thus uses an application-service-employee-device posture, for example, as maintained in the network and managed by the network-based controller 110 to enforce network security on a per application-service basis. The example system 100 provides a secure processing environment on the client device 102 that includes the client traffic agent 112 in order to provide per application-service selection of different security modes 402 & 404 & 406 for network communication between each individual application 200 and a service, such as lean trust (LTN) direct Internet access mode 404, a more secure overlay network (VPN) mode 402, and barred network access 406, based on the posture of a particular application 200 on a particular device 102 and on the numerous assessments of an application-service state making up an application's security posture.

Figure 6:
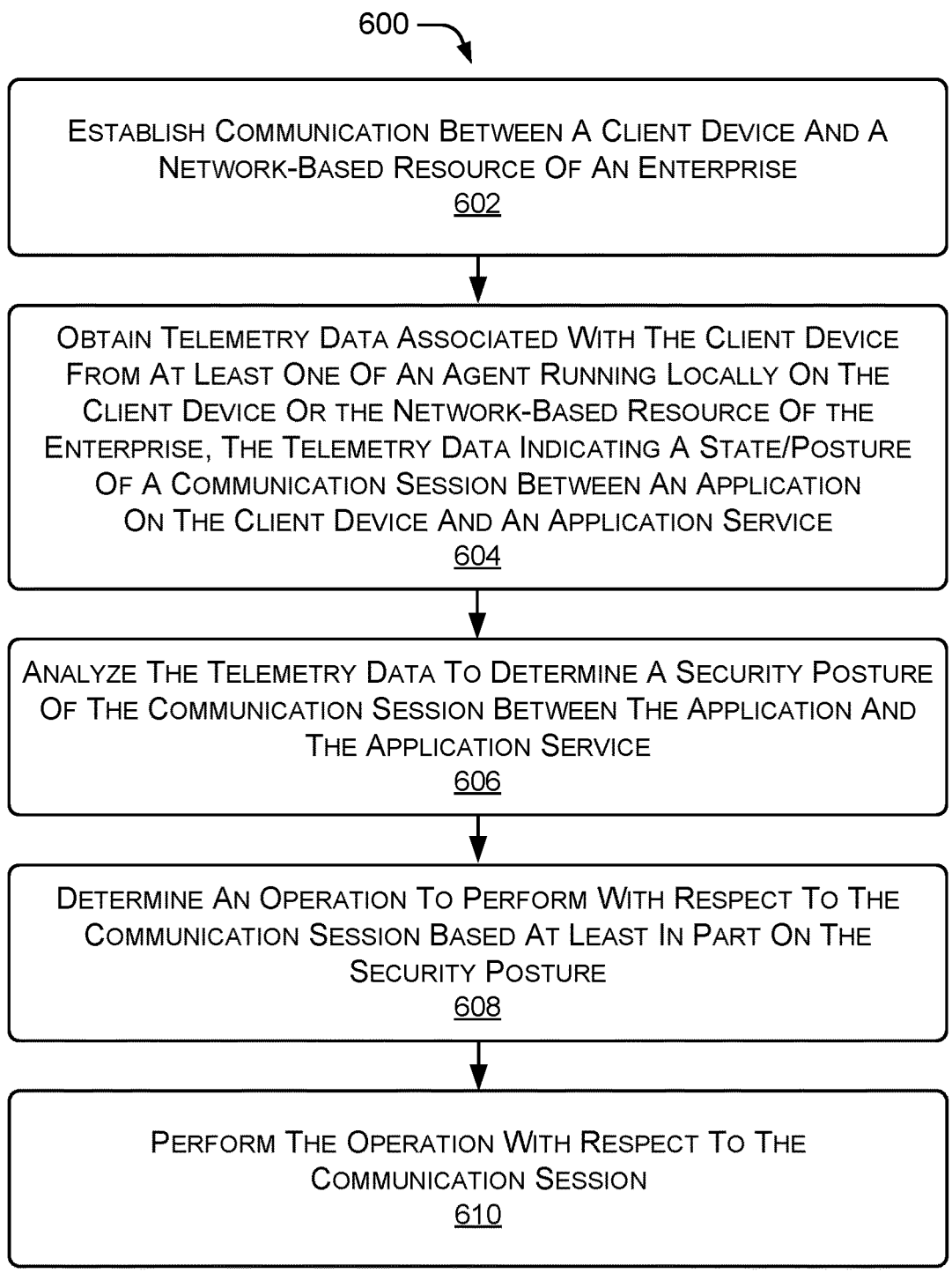
FIG. 6 is a flow diagram of an example method for providing dynamically tailored trust for secure application-service networking in an enterprise.

FIG. 6 shows an example method 600 of providing dynamically tailored trust for secure application-service networking in an enterprise. Operations of the example method 600 are shown in individual blocks. The example method 600 may be executed by components of the example system 100, such as example network-based controllers 110 and example agents 112.

At block 602, communication between a client device and a network-based resource of an enterprise is established. The client device is also a device of the enterprise, such as an employee's mobile device or smart phone. The network-based resource is in communication with numerous client devices of the enterprise, and communicates 1:1 with a given client device, but can also analyze and make decisions with respect to the given client device based on communication with numerous other client devices of the enterprise. The network-based resource is a resource of the enterprise. In an implementation, the network-based resource is a controller of communication sessions between particular applications on particular devices with particular services. Or, the network-based resource can be regarded as a nexus from which decisions can be made that are implemented by individual client devices.

At block 604, telemetry data associated with the client device is obtained from at least one of an agent running locally on the client device or from the network-based resource of the enterprise, the telemetry data indicating a state/posture of a communication session between an application on the client device and an application service. Both telemetry data local to the client device and telemetry data about the network, the user, the application service being connected to, and other contextual telemetry of the communication session are gathered to determine a comprehensive security posture of the communication session.

Examples of telemetry data include a security state of a hosting environment, authentication of the hosting environment, security states of virtual machines on the client device, evidences of tampering, security postures of system calls executed on the client device, socket maintenance metrics, an operating system release, availability of a trusted platform module (TPM), verification of a secure boot function, DNS information, the ambient environment of the client device, an SSID, cellular network identities, and so forth. Telemetry data may further include network data and general information, such as DNS records, SSO records, NetFlow records from a routers carrying traffic of the client device, service information obtained through an open API, user statuses such as standing of the user within the enterprise, rights and authorizations of the user to access enterprise services, and so forth.

The network-based resource may also gather status of an HTTP authentication or encryption method, determinations of an unsecure authentication or encryption mechanism, legislation standards limiting data storage and exchange to within a geographical country, industry regulations in place for a specific application or a specific service, and geographical constraints in place for a specific communications between an application and a service, for example.

At block 606, the telemetry data is analyzed to determine a security posture of the communication session between the application and the application service. For example, the method may check whether an agent of the enterprise was installed or activated properly on the local client device as part of a secure boot function of the client device. So for this analysis, the network-based resource monitors and validates the security of the secure boot function, and the security posture of the agent when the secure boot function is validated as secure. The telemetry data may also be analyzed on the client device itself, or with the aid of some other collaborating entity in communication with the network-based resource and/or one or more agents on a given client device.

In an implementation of the method, the network-based resource assesses the security posture of each communication session of each application communicating with an application service on each client device of the enterprise through a statistical audit process, and can enforce an operation on each communication session of each instance of the application, with respect to that application service, on each client device across the enterprise.

At block 608, an operation to perform with respect to the communication session is determined, based at least in part on the security posture. Once the security posture or other operative state of a communication session between an application and a service is determined for a particular client device and a particular user, as well as for the particular application and particular service in the communication session, the method determines an operation for the communication session with respect to security of the enterprise.

At block 610, the operation is performed with respect to the communication session. In an implementation, the operation may be changing the communication session from direct Internet access with lean-trust security to Internet access over a virtual private network (VPN), for example, or vice versa. The method may further dynamically change the communication session to denied (blocked) Internet access based at least in part on the security posture. So the method can firewall Internet access for a given communication session as controlled by the enterprise.

Figure 7:
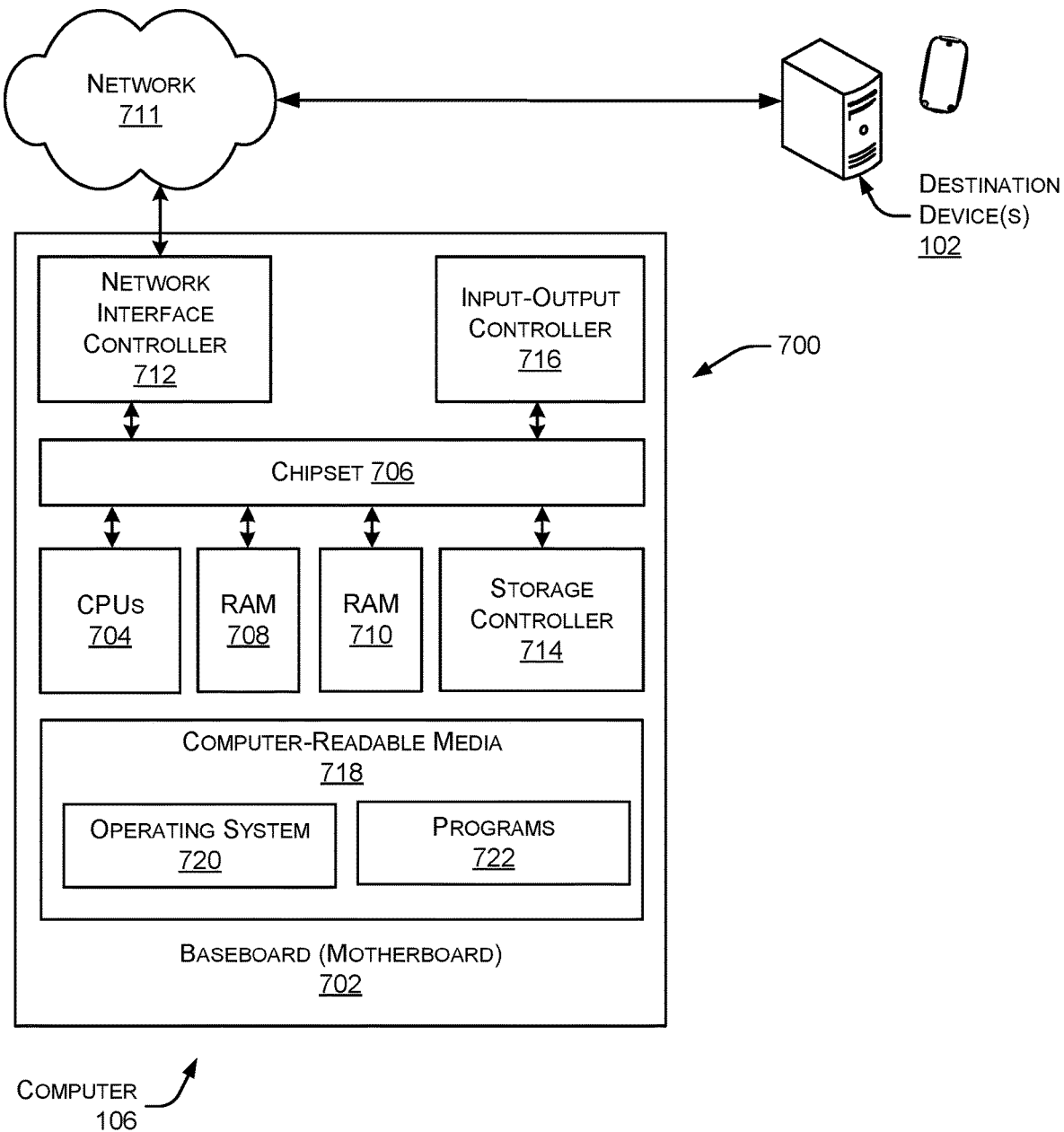
FIG. 7 is a computer architecture diagram showing an illustrative computer hardware architecture for implementing a server device that can be utilized to implement aspects of the various technologies presented herein.

FIG. 7 shows an example computer architecture 700 for a server computer, such as server 106, capable of executing program components for implementing the functionality described above. The computer architecture shown in FIG. 7 illustrates a conventional server computer, workstation, desktop computer, laptop, tablet, network appliance, e-reader, smart phone, or other computing device, and can be utilized to execute any of the software components presented herein. The server computer 106 may, in some examples, correspond to a physical server, such as server 106 described herein, and may comprise networked devices such as servers, switches, routers, hubs, bridges, gateways, modems, repeaters, access points, etc.

The computer 106 includes a baseboard 106, or "motherboard," which can be a printed circuit board to which a multitude of components or devices can be connected by way of a system bus or other electrical communication paths. In one illustrative configuration, one or more central processing units ("CPUs") 704 operate in conjunction with a chipset 706 via the system bus, controlled by one or more input/output controllers 716. The CPUs 704 can be standard programmable processors that perform arithmetic and logical operations necessary for the operation of the computer 106.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adderssubtractors, arithmetic logic units, floating-point units, and the like.

The chipset 706 provides an interface between the CPUs 704 and the remainder of the components and devices on the baseboard 106. The chipset 706 can provide an interface to a RAM 708, used as the main memory in the computer 106. The chipset 706 can further provide an interface to a computer-readable storage medium such as a read-only memory ("ROM") 710 or non-volatile RAM ("NVRAM") for storing basic routines that help to startup the computer 106 and to transfer information between the various components and devices. The ROM 710 or NVRAM can also store other software components necessary for the operation of the computer 106 in accordance with the configurations described herein.

The computer 106 can operate in a networked environment using logical connections to remote computing devices and computer systems through a network, such as the network 711. The chipset 706 can include functionality for providing network connectivity through a network interface controller (NIC) 712, such as a gigabit Ethernet adapter. The NIC 712 is capable of connecting the computer 106 to other computing devices over the network 711 (and/or 108). It should be appreciated that multiple NICs 712 can be present in the computer 106, connecting the computer to other types of networks and remote computer systems.

The computer 106 can be connected to a data storage device 718 that provides non-volatile data storage for the computer. The storage device 718 can store an operating system 720, programs 722, and data, which have been described in greater detail herein. The storage device 718 can be connected to the computer 106 through a storage controller 714 connected to the chipset 706. The storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 106 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the computer 106 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 106 can further read information from the storage device 718 by detecting the physical states or characteristics of one or more particular locations within the physical storage units.

In addition to the mass storage device 718 described above, the computer 106 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 106. In some examples, the operations performed by the network 711 or 108, and or any components included therein, may be supported by one or more devices similar to computer 106. Stated otherwise, some or all of the operations performed by the network 711 or 108, and or any components included therein, may be performed by one or more computer devices 106 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the computer 106. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 718 can store other system or application programs and data utilized by the computer 106.

In one embodiment, the storage device 718 or other computer-readable storage media is encoded with computer-executable instructions which, when loaded into the computer 106, transform the computer from a general-purpose computing system into a special-purpose computer capable of implementing the embodiments described herein. These computer-executable instructions transform the computer 106 by specifying how the CPUs 704 transition between states, as described above. According to one embodiment, the computer 106 has access to computer-readable storage media storing computer-executable instructions which, when executed by the computer 106, perform the various processes described above with regard to FIGS. 1-6. The computer 106 can also include computer-readable storage media having instructions stored thereupon for performing any of the other computer-implemented operations described herein.

The computer 106 can also include the one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computer 106 might not include all of the components shown in FIG. 7, can include other components that are not explicitly shown in FIG. 7, or might utilize an architecture completely different than that shown in FIG. 7.

As described herein, the computer 106 may also comprise one or more of a source device 106, an intermediary device, and/or a destination device 102. The computer 106 may include one or more hardware processors 704 (processors) configured to execute one or more stored instructions. The processor(s) 704 may comprise one or more cores. Further, the computer 106 may include one or more network interfaces configured to provide communications between the computer 106 and other devices, such as the communications described herein as being performed by the source device 106, intermediary device, and destination device 102. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method, comprising:
   determining that an application running on a client device is attempting to establish a communication session with a network-based resource of an enterprise;
   obtaining telemetry data associated with the client device from at least one of an agent running locally on the client device or the network-based resource;
   analyzing the telemetry data to determine a security posture of at least one of the client device or the application;
   determining that the application is connecting to an application service associated with the network-based resource;
   determining a required level of security required for the communication session based at least in part on the application service and the security posture;
   determining, at a network controller, whether the required level of security required for the communication session is satisfied by a first level of security associated with routing via a virtual private network (VPN) to the application service, or a second level of security associated with routing directly over an Internet with lean-trust security to the application service by determining that the network controller can trust the telemetry data associated with the client device by:
      determining a secure boot function has occurred;
      determining a mobile device management (MDM) is activated securely; and
      validating that the agent was securely activated as part of the secure boot function;
   in response to determining the required level of security required for the communication session is satisfied by the first level of security, instructing, by the network controller, the agent running on the client device to route the communication session via the VPN to the network-based resource; and
   in response to determining the required level of security required for the communication session is satisfied by the second level of security, instructing, by the network controller, the agent running on the client device to route the communication session over the Internet with lean-trust security to the network-based resource.

2. The method of claim 1, further comprising:
   instructing, by the network controller, the agent running on the client device to perform an operation with respect to the communication session; and
   receiving an indication of the operation from a security controller executing in collaboration with the agent running locally on the client device.

3. The method of claim 1, further comprising dynamically changing the communication session from the VPN to direct Internet access with lean-trust security.

4. The method of claim 3, further comprising dynamically changing the communication session to denied Internet access based at least in part on the security posture.

5. The method of claim 2, further comprising, at a security controller, assessing the security posture of each communication session of each application communicating with an application service on each client device of the enterprise through a statistical audit process; and
   enforcing an instance of the operation on each communication session of each instance of the application with respect to the application service on each client device across the enterprise.

6. The method of claim 1, wherein determining the communication session is to be routed via the VPN further comprises determining that at least one of the application, the application service, or a user associated with the client device has a security issue.

7. A system comprising:
   one or more processors; and
   one or more non-transitory computer-readable media storing computer-executable instructions that, when executed by the one or more processors, cause the one or more processors to:
      receive telemetry data associated with a client device of an enterprise from at least an agent running locally on the client device, the telemetry data indicating a posture of at least one of the client device or an application on the client device;
      analyze the telemetry data to determine a security posture of the at least one of the client device or the application;
      determine that the application established, or is establishing, a communication session with an application service;
      determine a required level of security required for the communication session based at least in part on the application service and the security posture;
      determine, at a network controller and, whether the required level of security required for the communication session is satisfied by a first level of security associated with routing via a virtual private network (VPN) to the application service, or a second level of security associated with routing directly over an Internet with lean-trust security to the application service by determining that the network controller can trust the telemetry data associated with the client device by:
         determining a secure boot function has occurred;
         determining a mobile device management (MDM) is activated securely; and validating that the agent was securely activated as part of the secure boot function;

in response to determining the required level of security required for the communication session is satisfied by the second level of security, instruct, by the network controller, the agent running locally on the client device to route the communication session via the VPN to the application service; and in response to determining the required level of security required for the communication session is satisfied by the second level of security, instructing, by the network controller, the agent running on the client device to route the communication session over the Internet with lean-trust security to the application service.

8. The system of claim 7, comprising further computer-executable instructions that, when executed by the one or more processors, cause the one or more processors to:

receive the telemetry data local to the client device, the telemetry data comprising a security state of a hosting environment, an authentication of the hosting environment, an evidence of tampering, a security posture of system calls executed on the client device, a socket maintenance metric, an operating system release, an availability of a trusted platform module (TPM), a verification of a secure boot function, DNS information, an ambient environment of the client device, an SSID, or a cellular network identity.

9. The system of claim 7, comprising further computer-executable instructions that, when executed by the one or more processors, cause the one or more processors to:

receive the telemetry data from a network-based resource, the telemetry data comprising a DNS record, a SSO record, a NetFlow record from a router carrying traffic of the client device, information associate with a service obtained through an open API, or a user status obtained from an identity provider, the user status comprising a right of the user to a service of the enterprise.

10. The system of claim 7, comprising further computer-executable instructions that, when executed by the one or more processors, cause the one or more processors to:

dynamically change the communication session from the VPN to direct Internet access with lean-trust security based at least in part on the security posture; and change the communication session to denied Internet access when the security posture is compromised past a threshold.

11. The system of claim 7, comprising further computer-executable instructions that, when executed by the one or more processors, cause the one or more processors to:

install or activate the agent to run locally on the client device as part of a secure boot function of the client device; and monitor and validate the security of the secure boot function and the security posture of the agent when the secure boot function is validated as secure.

12. The system of claim 7, comprising further computer-executable instructions that, when executed by the one or more processors, cause the one or more processors to:

assess the security posture of each communication session of each application communicating with an application service on each client device through a statistical audit process; and enforce an instance of an operation on each communication session of each instance of the application with respect to the application service on each client device across the enterprise.

13. A client device of an enterprise, comprising:
one or more processors; and
one or more non-transitory computer-readable media storing computer-executable instructions that, when executed by the one or more processors, cause the one or more processors to:

determine that an application running on the client device is attempting to establish communication with a network-based resource of the enterprise;

send telemetry data from the client device to the network-based resource for an analysis, the telemetry data indicating a posture of at least one of an application on the client device or the client device;

receive a determination of a security posture of the at least one of the application or the client device from the network-based resource;

determine that the application established, or is establishing, a communication session with an application service;

determine a required level of security required for the communication session based at least in part on the application service and the application is connecting to, or has connected to;

determine whether the required level of security required for the communication session is satisfied by a first level of security associated with routing via a virtual private network (VPN) to the application service, or a second level of security associated with routing directly over an Internet with lean-trust security to the application service by determining that a network controller can trust the telemetry data associated with the client device by:

determining a secure boot function has occurred;
determining a mobile device management (MDM) is activated securely; and
validating that an agent was securely activated as part of the secure boot function;

in response to determining the required level of security required for the communication session is satisfied by the first level of security, instructing, by the network controller, the agent running on the client device to route the communication session via the VPN to the network-based resource; and in response to determining the required level of security for the communication session is satisfied by the second level of security, instructing by the network controller, the agent running on the client device to route the communication session over the Internet with lean-trust security to the network-based resource.

14. The client device of claim 13, comprising further computer-executable instructions that, when executed by the one or more processors, cause the one or more processors to:

send telemetry data comprising local information collected by an agent of the client device running locally on the client device, the local information comprising a security state of a hosting environment, an authentication of the hosting environment, a security state of a virtual machine, an evidence of tampering, a security posture of system calls executed on the client device, a socket maintenance metric, an operating system release, an availability of a trusted platform module (TPM), a verification of a secure boot function, DNS information, an ambient environment of the client device, an SSID, or a cellular network identity.

15. The client device of claim 14, comprising further computer-executable instructions that, when executed by the one or more processors, cause the one or more processors to:
install or activate the agent running locally on the client device as part of a secure boot function of the client device, wherein the network-based resource monitors and validates the security of the secure boot function and the security posture of the agent when the secure boot function is validated as secure.

16. The client device of claim 13, comprising further computer-executable instructions that, when executed by the one or more processors, cause the one or more processors to:
dynamically change the communication session from a direct Internet access with lean-trust security to an Internet access over a virtual private network (VPN); and
change the communication session to denied Internet access when the security posture is compromised past a threshold.

17. The client device of claim 13, comprising further computer-executable instructions that, when executed by the one or more processors, cause the one or more processors to:
send telemetry data from the client device to the network-based resource for a statistical audit process of telemetry data from multiple client devices of the enterprise with respect to communication sessions of an application on multiple client devices; and
receive a security posture from the network-based resource for a communication session between the application and the application service.

18. The client device of claim 17, comprising further computer-executable instructions that, when executed by the one or more processors, cause the one or more processors to:
dynamically change communication sessions across multiple instances of the application on multiple client devices of the enterprise from direct Internet access with lean-trust security to Internet access over a virtual private network (VPN).

\* \* \* \* \*